United States Patent
Hou (10) Patent No.: US 10,152,950 B2
(45) Date of Patent: Dec. 11, 2018

(54) ELECTRONIC DEVICE AND IMAGE ADJUSTMENT METHOD

(71) Applicant: Wistron Corporation, New Taipei (TW)

(72) Inventor: Chia-Chang Hou, New Taipei (TW)

(73) Assignee: WISTRON CORPORATION, New Taipei (TW)

(*) Notice: Subject to any disclaimer, the term of this patent is extended or adjusted under 35 U.S.C. 154(b) by 292 days.

(21) Appl. No.: 14/076,367

(22) Filed: Nov. 11, 2013

(65) Prior Publication Data

US 2014/0240357 A1 Aug. 28, 2014

(30) Foreign Application Priority Data

Feb. 27, 2013 (TW) .............................. 102107037 A (51) Int. Cl.
*G09G 5/373* (2006.01)
*G09G 5/00* (2006.01)

(52) U.S. Cl.
CPC ............... *G09G 5/373* (2013.01); *G09G 5/00* (2013.01); *G09G 2340/0407* (2013.01); *G09G 2340/0492* (2013.01); *G09G 2354/00* (2013.01)

(58) Field of Classification Search
CPC ... A61B 5/6814; A61B 5/6815; A61B 5/6819; A61B 5/6821; G05B 2219/49007; G06F 3/03545; G06F 3/0421; G06F 3/04845; G06F 17/30038; H04N 5/23296; H04N 7/0122; H04N 1/32358; H04N 5/2628; H04N 9/31; H04N 1/33315; H04N 1/3935; H04N 1/40068; H04N 5/23238; H04N 13/0055; H04N 2213/002; H04N 5/23293; H04N 5/23219; H04N 2201/325;
(Continued)

(56) References Cited

U.S. PATENT DOCUMENTS

2002/0089489 A1* 7/2002 Carpenter ............. G06F 3/0386
345/158
2007/0177864 A1* 8/2007 Takahashi ............. G03B 13/02
396/287
(Continued)

FOREIGN PATENT DOCUMENTS

CN 102043576 A 5/2011
TW 200910938 A 3/2009
(Continued)

OTHER PUBLICATIONS

Trigonometric functions.*
(Continued)

*Primary Examiner* — Xilin Guo
(74) *Attorney, Agent, or Firm* — McClure, Qualey & Rodack, LLP (57) ABSTRACT

An electronic device is provided. The electronic device includes an image capturing device, a storage unit, a processing unit and a display device. The image capturing device captures a user image. The storage unit stores display contents. The processing unit identifies facial feature locations of the user image, and determines a vertical skew angle according to the facial feature locations. The processing unit further adjusts the display contents to a deformed image according to the vertical skew angle. The display device displays the deformed image.

18 Claims, 7 Drawing Sheets

(58) Field of Classification Search
CPC ........... G06K 9/00281; G06K 9/00248; G06K 9/00228; G06K 9/00268; G06K 9/0061; G06K 9/00221; G06K 9/00671; G06K 9/4604; G06K 9/621; G06K 9/00302; G06K 9/6209; G06K 9/627; G06K 2009/4666; G06K 9/46; G06K 9/00604; G06T 2215/16; G06T 7/11; G06T 7/73; G06T 2207/10061; G06T 2207/20221; G06T 2207/30201; G06T 2219/2021; G06T 5/002; G06T 2210/22; G06T 3/40; G06T 7/13; G06T 7/80; G06T 11/00; G09G 3/002; H04S 7/303; G10L 15/02; H04M 1/6033; H04M 1/0264; H04M 2250/52

See application file for complete search history.

(56) References Cited

U.S. PATENT DOCUMENTS

| | | | |
|---|---|---|---|
| 2008/0278516 A1* | 11/2008 | Santon | H04N 7/144 345/619 |
| 2009/0027732 A1* | 1/2009 | Imai | 358/3.27 |
| 2009/0109400 A1* | 4/2009 | Yoshinaga et al. | 351/210 |
| 2010/0135580 A1 | 6/2010 | Liu | |
| 2011/0096095 A1 | 4/2011 | Xu | |
| 2011/0129127 A1* | 6/2011 | Yang | G06K 9/00248 382/118 |
| 2013/0039581 A1* | 2/2013 | Yamazaki | G06K 9/00228 382/195 |
| 2014/0002586 A1* | 1/2014 | Nourbakhsh | H04N 7/144 348/14.16 |

FOREIGN PATENT DOCUMENTS

| | | |
|---|---|---|
| TW | I334306 | 12/2010 |
| TW | I369636 | 8/2012 |

OTHER PUBLICATIONS

English Abstract translation of TWI334306 (Published Dec. 1, 2010).
English Abstract translation of TWI369636 (Published Aug. 1, 2012).
TW Office Action dated Dec. 18, 2014.
Partial translation of TW Office Action dated Dec. 18, 2014.
SIPO Office Action dated May 26, 2016 in corresponding Chinese application (No. 201310087405.9).
English translation of SIPO Office Action dated May 26, 2016 in corresponding Chinese application (No. 201310087405.9).

* cited by examiner

ELECTRONIC DEVICE AND IMAGE ADJUSTMENT METHOD

This application claims the benefit of Taiwan application Serial No. 102107037, filed Feb. 27, 2013, the subject matter of which is incorporated herein by reference.

BACKGROUND OF THE INVENTION

Field of the Invention

The invention relates to an electronic device and an image adjustment method.

Description of the Related Art

Figure 1:
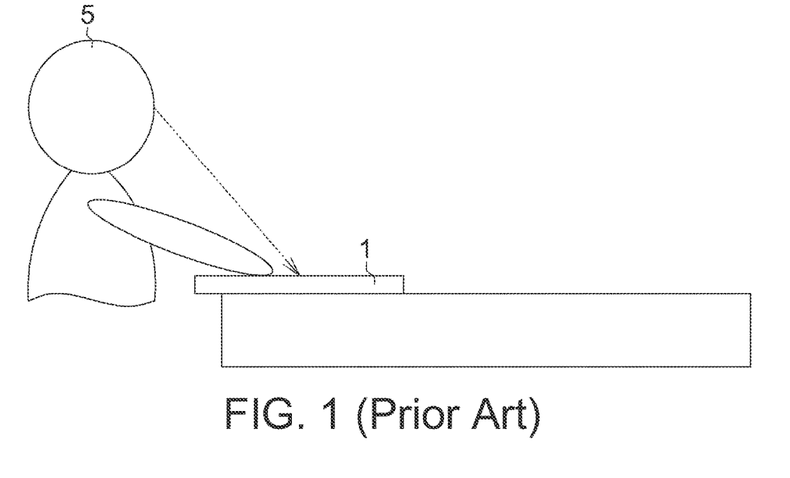
FIG. 1 is a schematic diagram of a user operating a tablet computer.

FIG. 1 shows a schematic diagram of a user operating a tablet computer. With the emergence of the multimedia era, the application scope of display devices is ever-increasing. Meanwhile, electronic devices equipped with display devices are also become more versatile and diversified, and have gradually become more familiar to people and extensively utilized. In addition to reading texts or view images, videos may also be viewed through electronic devices. An electronic device is exemplified by a tablet computer 1 in FIG. 1.

In general, a user face 5 needs to be right in front of the tablet computer 1 in order to correctly observe display contents. In practice, however, an angle of a user viewing the tablet computer 1 often changes. When the user face 5 views a display plane of the tablet computer 1 at a skew angle, the user may not be able to perceive a display image having an original normal scale.

SUMMARY OF THE INVENTION

The invention is directed to an electronic device and an image adjustment method.

According to the disclosure, an image adjustment method is provided. The image adjustment method includes capturing a user image by an image capturing device, identifying a facial feature location of the user image, determining a vertical skew angle according to the facial feature location, adjusting display contents into a deformed image according to the vertical skew angle, and displaying the deformed image by a display device.

According to the disclosure, an electronic device is further provided. The electronic device includes an image capturing device, a storage unit, a processing unit and a display device. The image capturing device captures a user image. The storage unit stores image contents. The processing unit identifies a facial feature location of the user image, and determines a vertical skew angle according to the facial feature location. The processing nit further adjusts the display contents into a deformed image according to the vertical skew angle. The display device displays the deformed image.

The above and other aspects of the invention will become better understood with regard to the following detailed description of the preferred but non-limiting embodiments. The following description is made with reference to the accompanying drawings.

DETAILED DESCRIPTION OF THE INVENTION

First Embodiment

Figure 2:
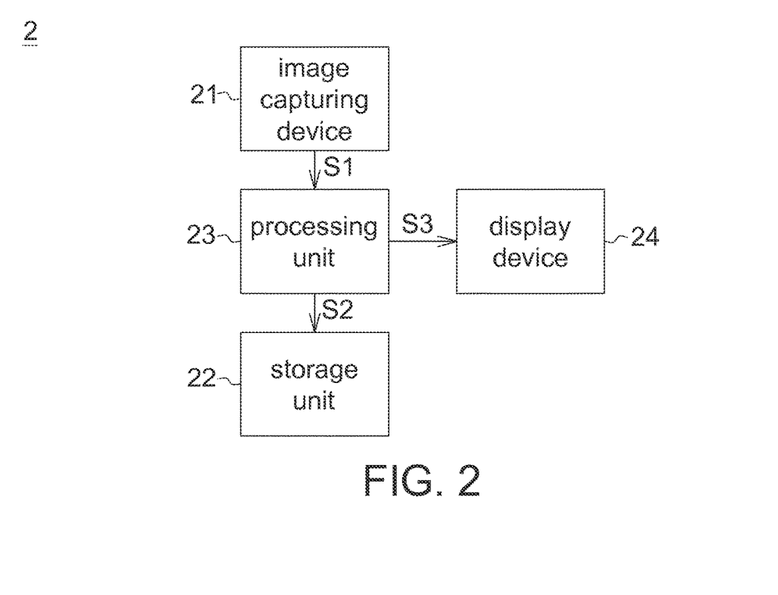
FIG. 2 is a block diagram of an electronic device according to a first embodiment.
Figure 3:
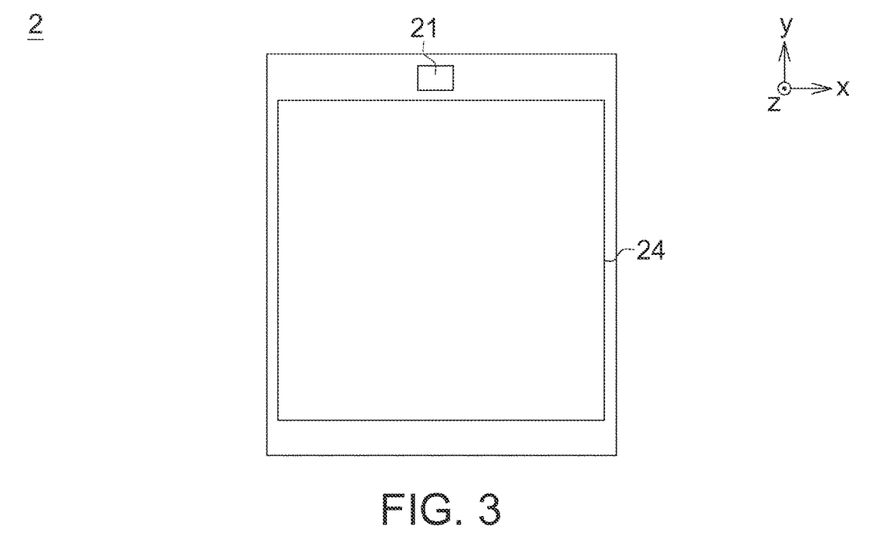
FIG. 3 is a top view of an electronic device according to the first embodiment.

FIG. 2 shows a block diagram of an electronic device according to a first embodiment; FIG. 3 shows a top view of an electronic device according to the first embodiment. Referring to FIGS. 2 and 3, an electronic device 2 includes an image capturing device 21, a storage unit 22, a processing unit 23 and a display device 24. For example, the electronic device 2 is a tablet computer, a portable handset, or an all-in-one (AIO) computer. The processing unit 23 is coupled to the image capturing device 21, the storage unit 22 and the display device 24. For example, the image capturing device 21 is a camera lens, and the storage unit 22 stores display contents S2. For example, the display contents S2 are texts or a picture. The horizontal direction of the display device 24 is represented by the x-axis, and the vertical direction of the display device 24 is represented by the y-axis. The z-axis is perpendicular to a display plane of the display device 24.

Figure 4:
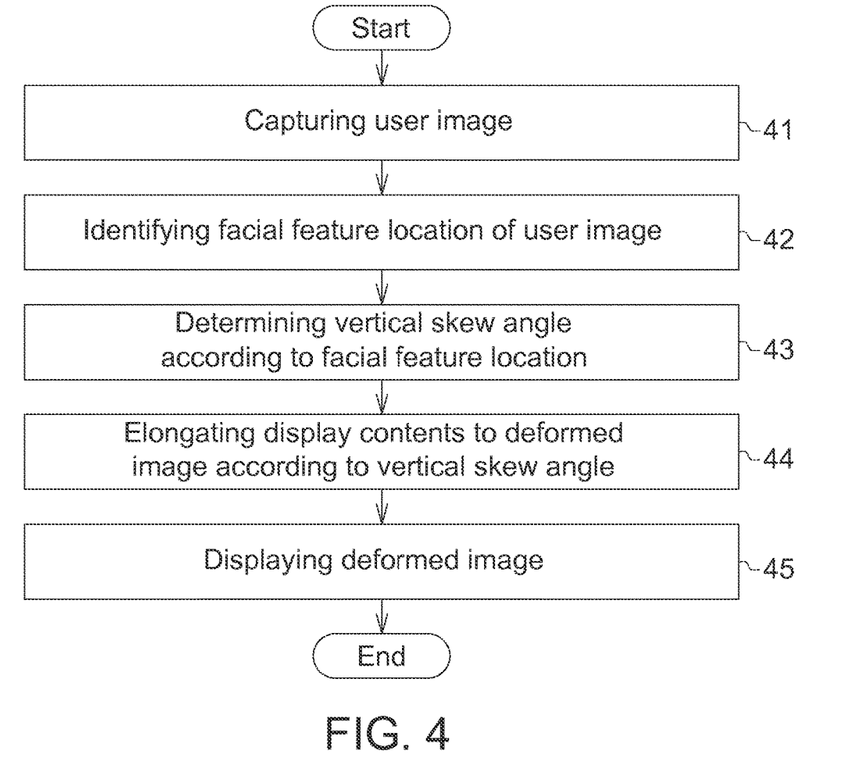
FIG. 4 is a flowchart of an image adjustment method according to the first embodiment.
Figure 5:
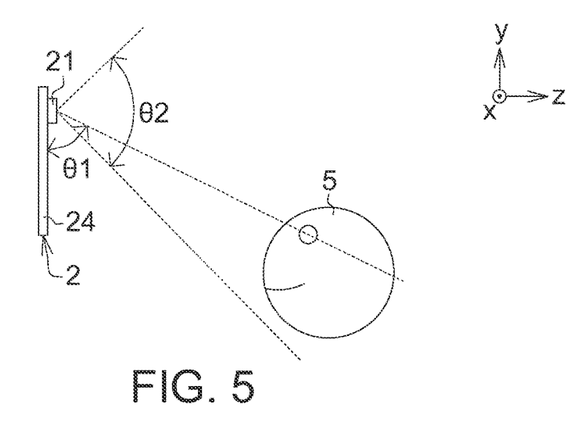
FIG. 5 is a schematic diagram of a vertical skew angle between a user and an electronic device.
Figure 6:
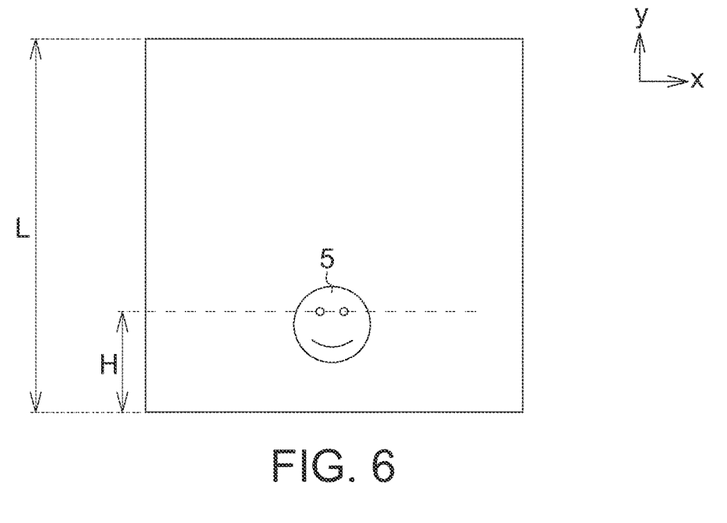
FIG. 6 is a schematic diagram of a user image according to the first embodiment.

FIG. 4 shows a flowchart of an image adjustment method according to the first embodiment; FIG. 5 shows a schematic diagram of a vertical skew angle between a user and an electronic device; FIG. 6 shows a schematic diagram of a user image according to the first embodiment. Referring to FIG. 4 as well as FIGS. 2, 3, 5 and 6, the image adjustment method is applicable to the foregoing electronic device 2, and includes the following steps.

In step 41, the image capturing device 21 captures a user image S1. In step 42, the processing unit 23 identifies a facial feature location of the user image S1. For example, the facial feature location is a location of the left eye, a location of the right eye, locations of eyebrows, a location of the mouth, or a location of the nose of a user face 5. In step 43, the processing unit 23 determines a vertical skew angle $\theta 1$ according to the facial feature location. The vertical skew angle $\theta 1$ is formed by a line connecting the image capturing device 21 and the user face 5, and the vertical direction of the display device 24 (i.e., the y-axis). In step 44, the processing unit 23 adjusts the display contents S2 into a deformed image S3 according to the vertical skew angle $\theta 1$. For example, the deformed image S3 is an elongated image, and the processing unit 23 elongates the display contents S2 into the deformed image S3 according to the vertical skew angle $\theta 1$. In step 45, the display device 24 displays the deformed image S3.

Further, a length L of the user image S1 corresponds to a viewable angle range $\theta 2$ of the image capturing device 21, and the processing unit 23 determines the vertical skew angle θ1 from the viewable angle range θ2 according to a vertical height H of the facial feature location in the user image S1. For example, when the viewable angle range θ2 of the image capturing device 21 is 120 degrees, the processing unit 23 divides the user image S1 into 120 predetermined vertical heights, with the 120 predetermined vertical heights corresponding to 120 predetermined skew angles, respectively. The processing unit 23 identifies the corresponding predetermined vertical height according to the facial feature location, and determines the vertical skew angle θ1 from the 120 predetermined skew angles according to the vertical height.

The correspondence between the predetermined skew angles and the predetermined vertical heights may also be recorded as a mapping table. According to the facial feature location and the mapping table, the processing unit 23 is allowed to quickly determine the vertical skew angle θ1 to eliminate the step of calculating the vertical skew angle θ1 and to thus increase a processing speed.

Figure 7:
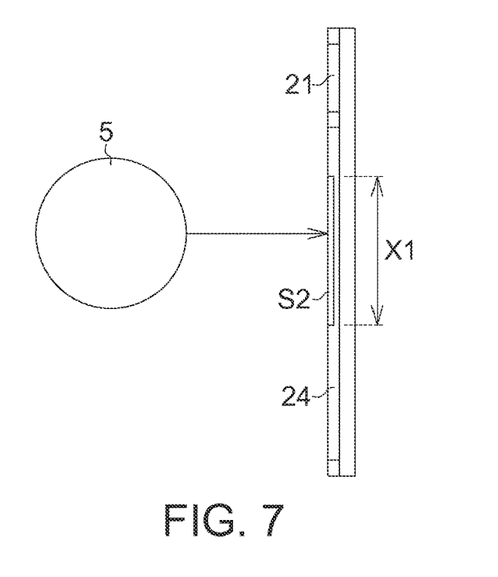
FIG. 7 is a schematic diagram of a user viewing display contents.
Figure 8:
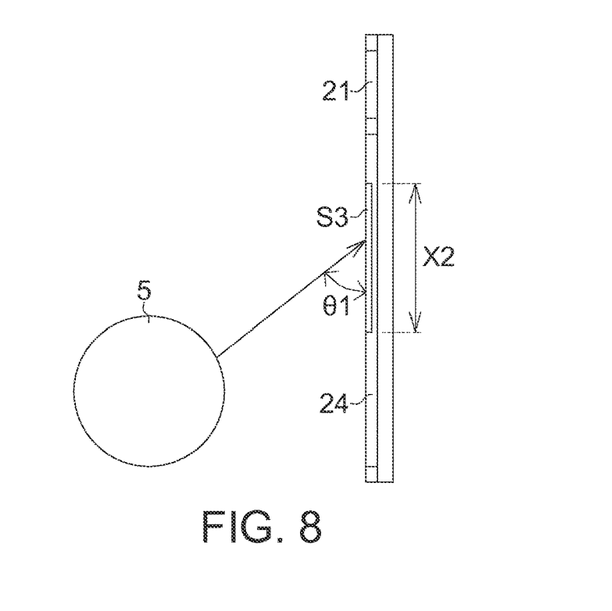
FIG. 8 is a schematic diagram of a user viewing a deformed image.

FIG. 7 shows a schematic diagram of a user viewing display contents; FIG. 8 shows a schematic diagram of a user viewing a deformed image. Referring to FIGS. 2, 7 and 8, the processing unit 23 adjusts the display contents S2 into the deformed image S3 according to a cosecant function and the vertical skew angle θ1. A height X2 of the deformed image S3 is greater than a height X1 of the display contents S2. For example, height X2=csc (θ1)×height X1. As the deformed image S3 displayed by the display device 24 is adjusted, the user located at the vertical skew angle θ1 is allowed to perceive a normal image as the display contents S2. The processing unit 23 may further control a length of the deformed image S3 to be not greater than a length of screen resolution of the display device 24.

Second Embodiment

Figure 9:
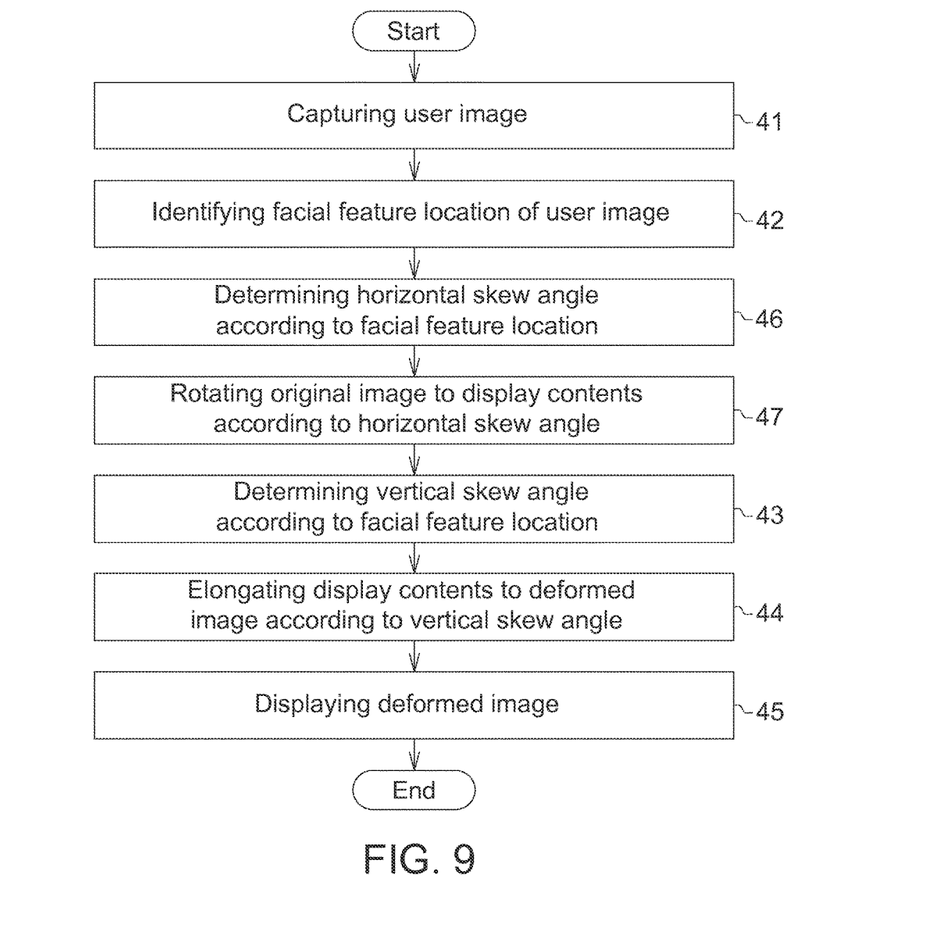
FIG. 9 is a flowchart of an image adjustment method according to a second embodiment.
Figure 10:
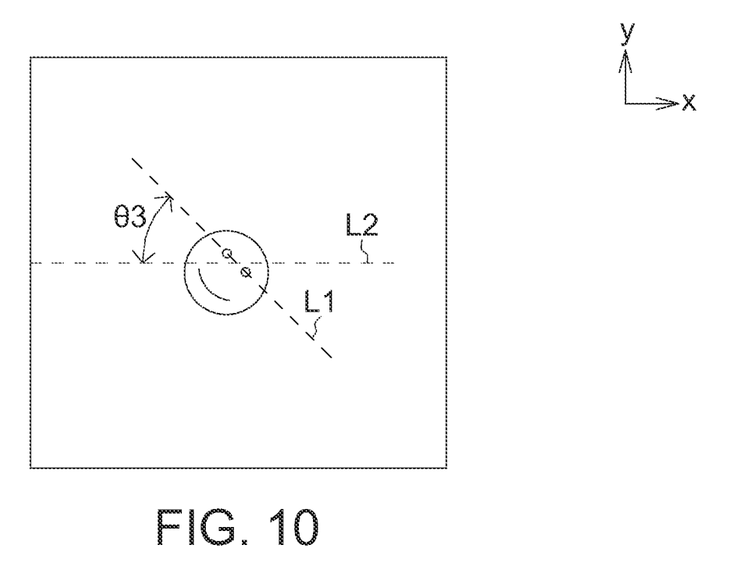
FIG. 10 is a schematic diagram of a user image according to the second embodiment.

FIG. 9 shows a flowchart of an image adjustment according to a second embodiment; FIG. 10 shows a schematic diagram of a user image according to the second embodiment. Referring to FIGS. 2, 9 and 10, for illustrative purposes, facial feature locations in the second embodiments are exemplified by a location of the right eye and a location of the left eye, and a line L1 connecting the locations of the right eye and the left eye together with a horizontal direction L2 (i.e., the x-axis) of a user image form a horizontal skew angle θ3. A main difference of the second embodiment from the first embodiment is that, the second embodiment further includes steps 46 and 47. As shown in step 46, the processing unit 23 determines the horizontal skew angle θ3 according to the facial feature locations. In step 47, the processing unit 23 rotates an original image into the display contents S2 according to the horizontal skew angle θ3. Steps 43 and 45 are subsequently performed.

Therefore, in the second embodiment, the processing unit 23 first rotates the original image to the display contents S2 satisfying a viewing angle of the user, and then adjusts the display contents S2 into the deformed image S3. As such, it is ensured that the deformed image S3 displayed by the display device 24 satisfies the viewing angle of the user.

Third Embodiment

Referring to FIG. 2, when an original image is a picture, the processing unit 23 first reduces the original image to the display contents S2. At this point, a resolution of the display contents S2 is equal to a predetermined resolution, e.g., VGA or QVGA. The display contents S2 are then adjusted into the deformed image S3. Thus, the deformed image S3 is prevented from exceeding a displayable range of the display device 24.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image adjustment method, comprising:
    providing an electronic device having a front-facing image capturing device and a front-facing display device;
    displaying a display content by the display device, wherein the display content is not an original image captured by the image capturing device;
    capturing, with the image capturing device, a user image of a user while using the electronic device;
    identifying a facial feature location of the user according to the user image;
    determining a vertical skew angle of the electronic device relative to the user according to the facial feature location;
    elongating the display content into a deformed image according to the vertical skew angle, wherein the deformed image is an elongated image; and
    displaying the deformed image by the display device.

2. The image adjustment method according to claim 1, wherein the vertical skew angle is formed by a line connecting the image capturing device and a user face, and a vertical direction of the display device.

3. The image adjustment method according to claim 1, further comprising:
    determining a horizontal skew angle according to the facial feature location; and
    rotating an original image to the display contents according to the horizontal skew angle.

4. The image adjustment method according to claim 3, wherein the facial feature location comprises a left-eye location and a right-eye location; the horizontal skew angle is formed by a line connecting the left-eye location and the right-eye location, and a horizontal direction of the user image.

5. The image adjustment method according to claim 1, wherein the elongating step elongates the display contents into the deformed image according to a cosecant function and the vertical skew angle.

6. The image adjustment method according to claim 1, wherein a length of the deformed image is not greater than a length of a screen resolution of the display device.

7. The image adjustment method according to claim 1, further comprising:
    reducing an original image to the display content;
    wherein, a resolution of the display content is a predetermined resolution.

8. The image adjustment method according to claim 1, wherein a length of the user image corresponds to a viewable angle range of the image capturing device, and the vertical skew angle is determined from the viewable angle range according to a vertical height of the facial feature location in the user image.

9. The image adjustment method according to claim 1, wherein the vertical skew angle is determined according to the facial feature location and a mapping table, and the facial feature location is a left-eye location or a right-eye location.

10. An electronic device, comprising:
 a front-facing image capturing device, for capturing a user image of a user while using the electronic device;
 a storage unit, for storing a display content, wherein the display content is not an original image captured by the image capturing device;
 a processing unit, for identifying a facial feature location of the user according to the user image, determining a vertical skew angle of the electronic device relative to the user according to the facial feature location, and elongating the display content into a deformed image according to the vertical skew angle, wherein the deformed image is an elongated image; and
 a front-facing display device, for displaying the display content and the deformed image.

11. The electronic device according to claim 10, wherein the vertical skew angle is formed by a line connecting the image capturing device and a user face, and a vertical direction of the display device.

12. The electronic device according to claim 10, wherein the processing unit identifies a horizontal skew angle according to the facial feature location, and rotates an original image to the display contents according to the horizontal skew angle.

13. The electronic device according to claim 12, wherein the facial feature location comprises a left-eye location and a right-eye location; the horizontal skew angle is formed by a line connecting the left-eye location and the right-eye location, and a horizontal direction of the user image.

14. The electronic device according to claim 10, wherein the processing unit elongates the display content to the deformed image according to a cosecant function and the vertical skew angle.

15. The electronic device according to claim 10, a length of the deformed image is not greater than a length of a screen resolution of the display device.

16. The electronic device according to claim 10, wherein the processing unit reduces an original image to the display contents, and a resolution of the display content is a predetermined resolution.

17. The electronic device according to claim 10, wherein a length of the user image corresponds to a viewable angle range of the image capturing device, and the vertical skew angle is determined from the viewable angle range according to a vertical height of the facial feature location in the user image.

18. The electronic device according to claim 10, wherein the processing unit determines the vertical skew angle according to the facial feature location and a mapping table, and the facial feature location is a left-eye location or a right-eye location.

* * * * *